United States Patent
Ichimiya

(10) Patent No.: US 7,734,164 B2
(45) Date of Patent: *Jun. 8, 2010

(54) FOCUS STATE DETECTION APPARATUS AND OPTICAL INSTRUMENT

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/406,358

(22) Filed: Mar. 18, 2009

(65) Prior Publication Data

US 2009/0180772 A1     Jul. 16, 2009

Related U.S. Application Data

(63) Continuation of application No. 11/350,615, filed on Feb. 8, 2006, now Pat. No. 7,512,330.

(30) Foreign Application Priority Data

Feb. 8, 2005   (JP) .............................. 2005-031278

(51) Int. Cl.
*G03B 3/00* (2006.01)
(52) U.S. Cl. ........................................ 396/96; 348/345
(58) Field of Classification Search ................... 396/96; 348/345
See application file for complete search history.

(56) References Cited

U.S. PATENT DOCUMENTS

| 5,939,705 A | 8/1999 | Nakamura |
| 6,694,097 B2 | 2/2004 | Tsunemiya et al. |
| 2001/0014215 A1 | 8/2001 | Ide et al. |
| 2004/0008983 A1 | 1/2004 | Kanemitsu |
| 2004/0165878 A1 | 8/2004 | Nakata |

FOREIGN PATENT DOCUMENTS

| JP | 63-172206 | 7/1988 |
| JP | 9-54242 | 2/1997 |
| JP | 2003-215442 | 7/2003 |

*Primary Examiner*—Melissa J Koval
*Assistant Examiner*—Fang-Chi Chang
(74) *Attorney, Agent, or Firm*—Canon U.S.A., Inc. I.P. Division

(57) ABSTRACT

A focus state detection apparatus has a sensor that senses light rays that pass through a lens subjected to focus detection and is composed of a plurality of photoelectric converter elements, a charge accumulation unit that accumulates pixel signals obtained by the sensor, a first accumulation controller, a second accumulation controller, a first storage unit that stores each accumulated signal of each of the plurality of areas accumulation-controlled by the first accumulation controller, a second storage unit that stores the accumulated signal of the combined area accumulation-controlled by the second accumulation controller, and a defocus state detector that detects a defocus state of the area from the accumulated signal stored in either the first storage unit or the second storage unit.

7 Claims, 10 Drawing Sheets

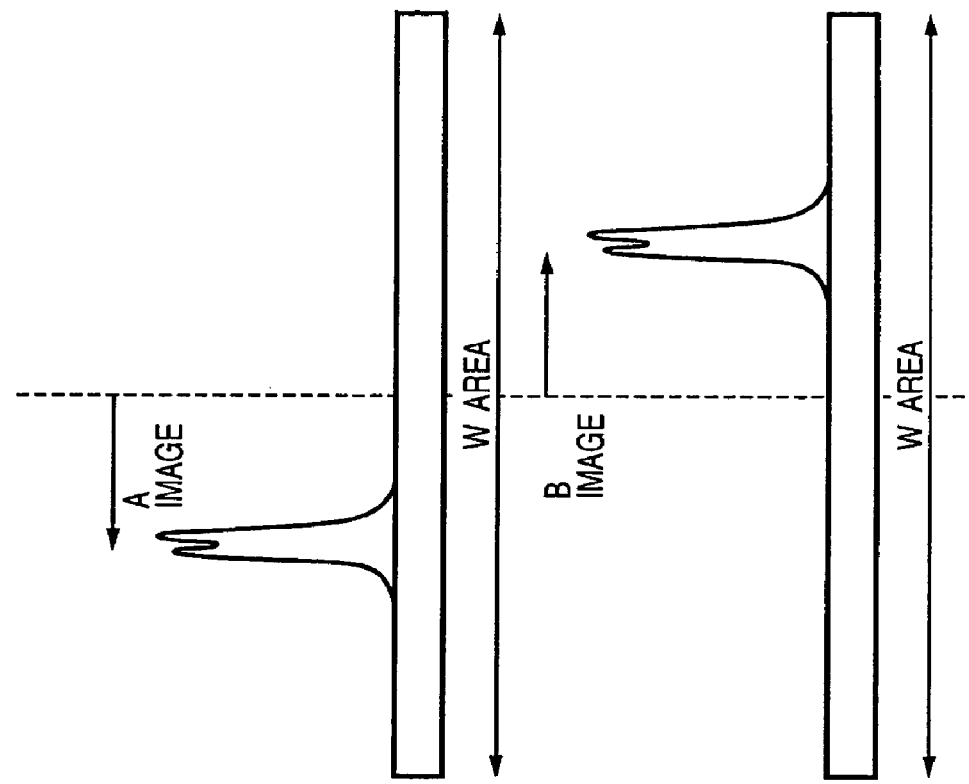
FIG. 10B  WHEN GREATLY DEFOCUSED
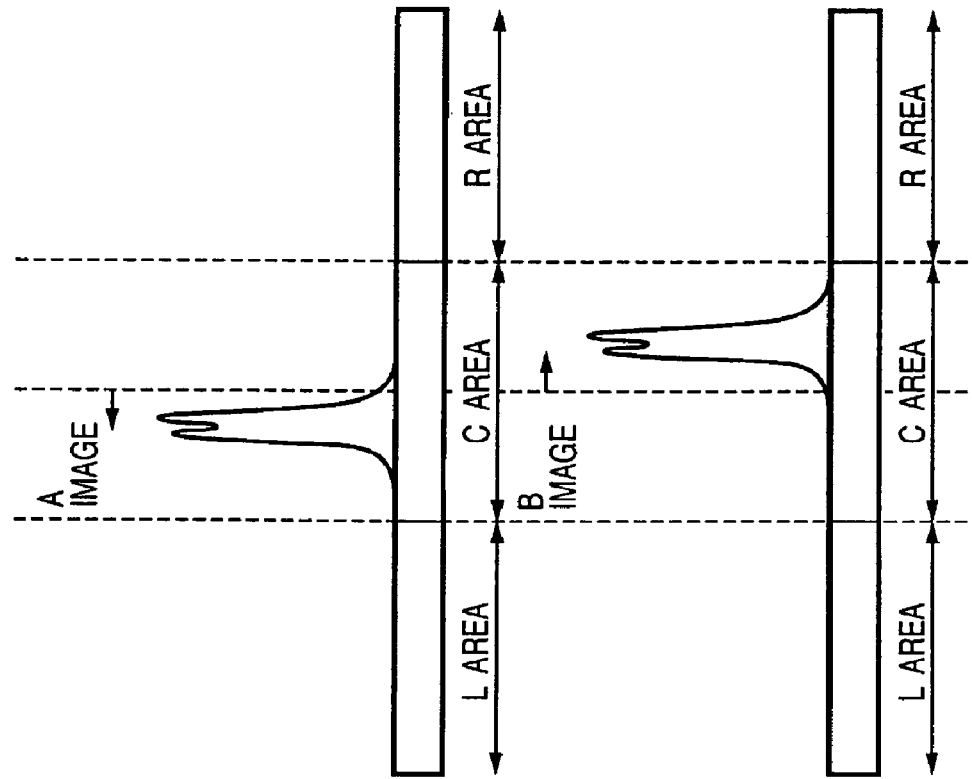
FIG. 10A  WHEN SLIGHTLY DEFOCUSED

FOCUS STATE DETECTION APPARATUS AND OPTICAL INSTRUMENT

RELATED APPLICATION INFORMATION

This application is a continuation of co-pending U.S. application Ser. No. 11/350,615 filed Feb. 8, 2006, which is incorporated herein by reference.

FIELD OF THE INVENTION

The present invention relates to a focus state detection apparatus having a sensor that senses light rays that pass through a lens subjected to focus detection and an optical instrument such as a camera, mobile phone or the like that is equipped with such focus state detection apparatus.

BACKGROUND OF THE INVENTION

Conventionally, as a camera focus state detection apparatus, a so-called phase difference focus detection method-type focus state detection apparatus is known. In the phase difference focus detection method, light rays from a subject that pass through different exit pupil areas of an image sensing lens are focused on a pair of line sensors. Then, by obtaining the amount of shift of the relative positions of the pair of subject images obtained by photoelectric conversion of the subject images (hereinafter, this process is called "phase difference computation"), a subject defocus amount is detected and the image sensing lens is driven based on that detected amount of defocus (for example, Japanese Patent Application Laid-Open No. 09-054242).

In addition, a multi-point focus detection apparatus that carries out focus detection of a plurality of subjects is also known. In such an apparatus, the pair of line sensors is divided among a plurality of areas, signal charge accumulation control is carried out for each area, and the pairs of subject images obtained by photoelectric conversion at each of these areas are correlated (for example, Japanese Patent Application Laid-Open No. 2003-215442).

In addition, in the focus state detection apparatus using the phase difference focus detection method, a focus state detection apparatus that can adjust the detectable defocus amount by changing the area of the pair of line sensors used for charge accumulation control and phase difference computation is also known (for example, Japanese Patent Application Laid-Open No. 63-172206; see FIG. 8).

The focus state detection apparatus disclosed in Japanese Patent Application Laid-Open No. 63-172206 makes it possible to select an appropriate charge accumulation control area depending on the focus state detection results and the maximum defocus amount of the image sensing lens. However, where focus state detection does not function, it is necessary to change the charge accumulation control area and to redo the charge accumulation operation and the phase difference computation operation, which lengthens the time required for focus state detection.

In addition, the focus state detection apparatus of Japanese Patent Application Laid-Open No. 63-172206 can also be adapted to a multi-point focus detection apparatus that enables focus state detection of a plurality of subjects like the focus state detection apparatus of Japanese Patent Application Laid-Open No. 2003-215442. As an example of an instance in which such a focus state detection apparatus is created, charge accumulation control areas at three distance measurement points (focus state detection areas) are illustrated in FIGS. 10A and 10B.

FIG. 10A shows the line sensor charge accumulation control areas (L area, C area and R area) when the amount of defocus is small (small defocus amount) and the subject images phase difference (that is, the extent of the displacement between the images) is also small. In the case of a small defocus amount, the phase difference between the subject images is small and the breadth of each area can be narrowed, thus enabling focus state detection of a plurality of subjects from signals obtained from each of these areas.

By contrast, FIG. 10B shows the line sensor charge accumulation control area (W area) when the amount of defocus is large (large defocus amount). The subject images phase difference is large, and therefore it is necessary to use the entire line as a single area in order to prevent the subject image from projecting beyond the boundaries of the area.

Thus, as described above, where the focus state detection apparatus of Japanese Patent Application Laid-Open No. 63-172206 is adapted to the multi-point focus detection apparatus like the focus state detection apparatus of Japanese Patent Application Laid-Open No. 2003-215442, initially a charge accumulation operation is carried out over a divided area like those shown in FIG. 10A even when the amount of defocus is large, and thereafter, if the defocus amount is in fact large, it is then necessary to carry out the charge accumulation operation once again over an area like that shown in FIG. 10B. Consequently, the time needed for focus state detection necessarily lengthens, which is undesirable.

SUMMARY OF THE INVENTION

The present invention has been made in consideration of the above situation, and has as its object to provide a multi-point focus detection apparatus that reduces the time needed for focus state detection even when the amount of defocus is large.

According to the present invention, the foregoing object is attained by providing a focus state detection apparatus comprising: a sensor that senses light rays that pass through a lens subjected to focus detection and is composed of a plurality of photoelectric converter elements; a charge accumulation unit that accumulates pixel signals obtained by the sensor; a first accumulation controller that controls accumulation carried out by the charge accumulation unit at each area of a plurality of areas into which the sensor is divided; a second accumulation controller that combines at least a portion of the plurality of areas into a single combined area and controls accumulation carried out by the charge accumulation unit at such combined area; a first storage unit that stores each accumulated signal of each of the plurality of areas accumulation-controlled by the first accumulation controller; a second storage unit that stores the accumulated signal of the combined area accumulation-controlled by the second accumulation controller; and a defocus state detector that detects a defocus state of the area from the accumulated signal stored in either the first storage unit or the second storage unit.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A and 10B are diagrams illustrating focus state detection methods when the defocus amount is small and when the defocus amount is large, respectively, in the conventional art as well as in the present invention.

DETAILED DESCRIPTION OF THE PREFERRED EMBODIMENT

A preferred embodiment of the present invention will now be described in detail in accordance with the accompanying drawings.

Figure 1:
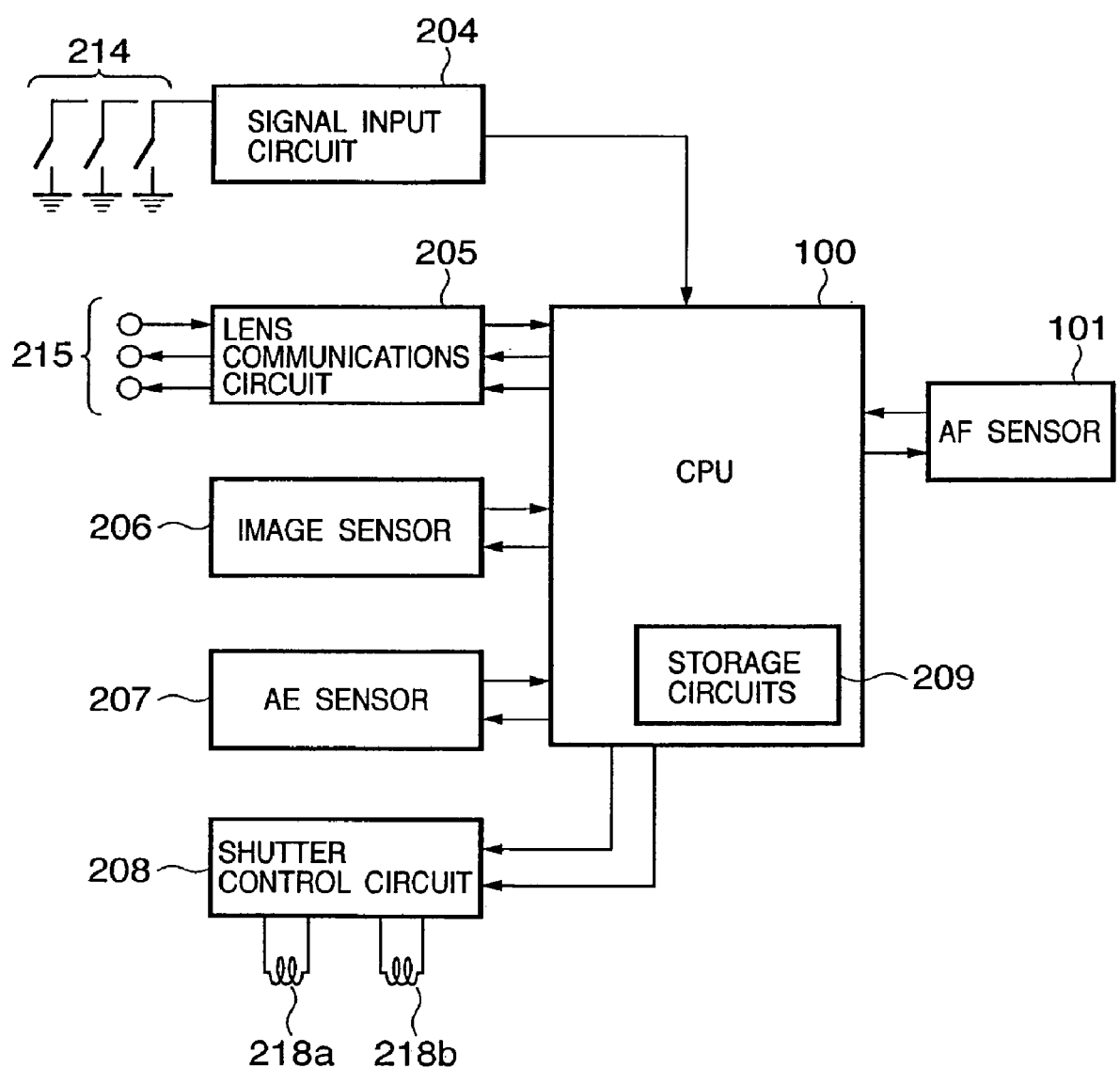
FIG. 1 is a block diagram showing a circuit structure of a camera according to an embodiment of the present invention.

FIG. 1 is a block diagram showing the circuit structure for a camera according to an embodiment of the present invention. In FIG. 1, reference numeral 100 designates a camera microcomputer (hereinafter "CPU") 100. A signal input circuit 204 for detecting the settings of a group of switches 214 used for various operation of the camera, an image sensor 206, an AE sensor 207, a shutter control circuit 208 for controlling shutter magnets 218a, 218b, and an AF sensor 101 are connected to the CPU 100. The CPU 100 exchanges signals 215 with an image sensing lens to be described later via a lens communications circuit 205 as well as controls a focus position and an aperture. The operations of the camera are determined by the settings of the group of switches 214.

The AF sensor 101 is provided with a pair of line sensors. By controlling the AF sensor 101, the CPU 100 detects the amount of defocus from the contrast distribution of the subject obtained by the line sensors and controls the focus position of the image sensing lens. Moreover, by controlling the AE sensor 207, the CPU 100 detects the brightness of the subject and determines the image sensing lens aperture setting and shutter speed. Then, through the lens communications circuit 205, the CPU 100 adjusts the aperture setting in the image sensing lens. In addition, through the shutter control circuit 208, the CPU 100 controls the time the shutter magnets 218a, 218b are energized and thus adjusts the shutter speed, and further, controls the image sensor 206 to carry out an image sensing operation.

Storage circuits 209 such as a ROM storing a program that controls the operation of the camera, a RAM for storing variables, and an EEPROM (Electrically Erasable Programmable Read-Only Memory) for storing such parameters are built into the CPU 100.

Next, a description will be given of the layout of the camera optical system using FIG. 2.

Most of the light rays reflected from the subject entering the camera through an image sensing lens 300 are reflected upward by a quick return mirror 305 and focused on a viewfinder screen 303. A user of the camera observes this image through a pentaprism 301 and an eye piece lens 302. A portion of the image sensing light rays passes through the quick return mirror 305 and is bent downward by a rear sub-mirror 306, through a field mask 307, a field lens 311, an aperture 308, and a secondary focusing lens 309, and focused on the AF sensor 101. By processing an image signal obtained by photoelectric conversion of this image, the focus state of the image sensing lens 300 can be detected. During image sensing, the quick return mirror 305 pops up, all the light rays are focused on the image sensor 206, and exposure of the subject image is carried out.

Figure 2:
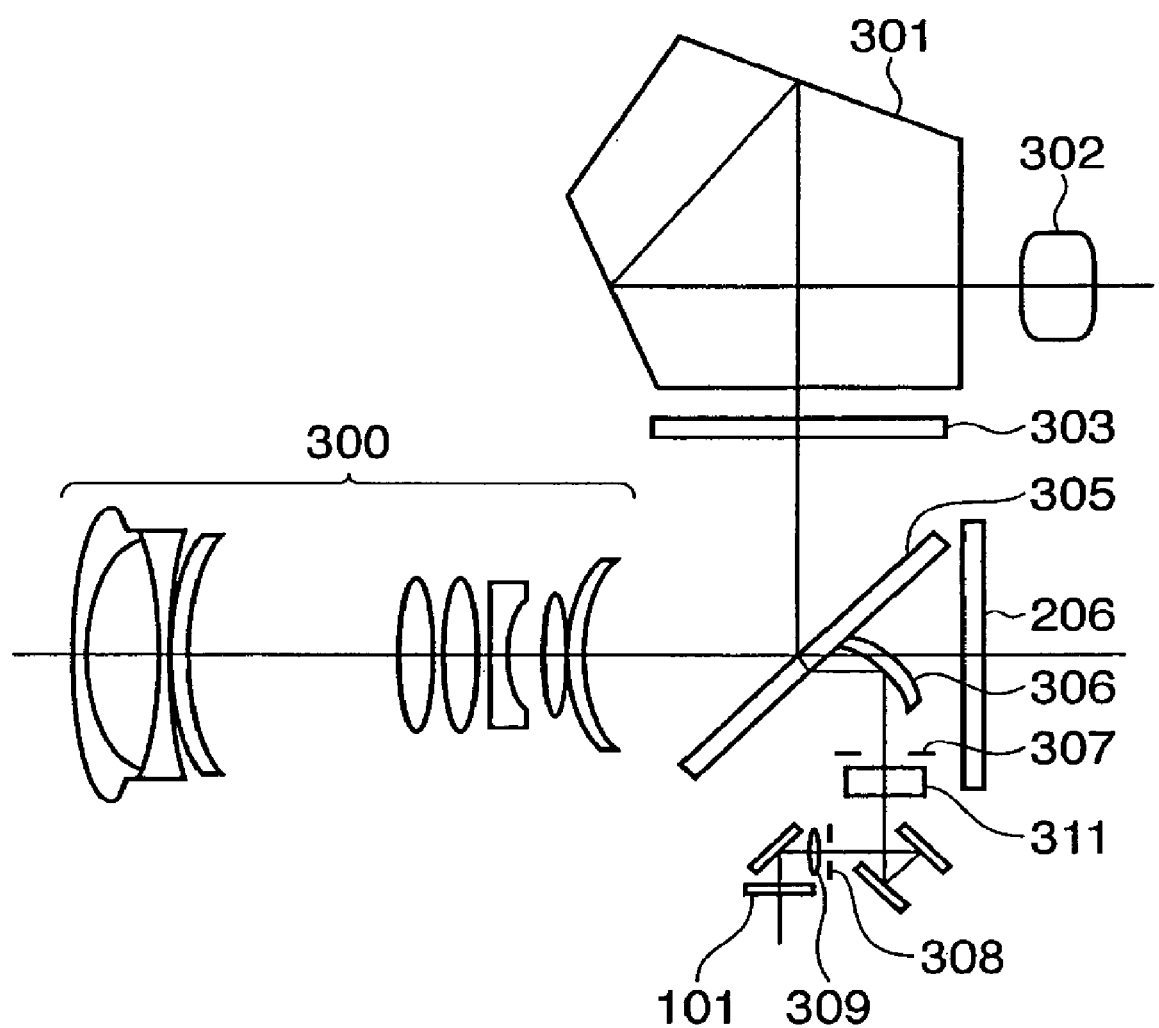
FIG. 2 is a diagram showing an optical system layout of a camera according to the embodiment of the present invention.

The focus state detection apparatus of the present embodiment, in FIG. 2, is comprised of from the field mask 307 to the secondary focusing lens 309 including the AF sensor 101. The focus state detection method of this focus state detection apparatus is the well known phase difference focus detection method, enabling detection of the focus state of a plurality of different areas within the screen.

Figure 3:
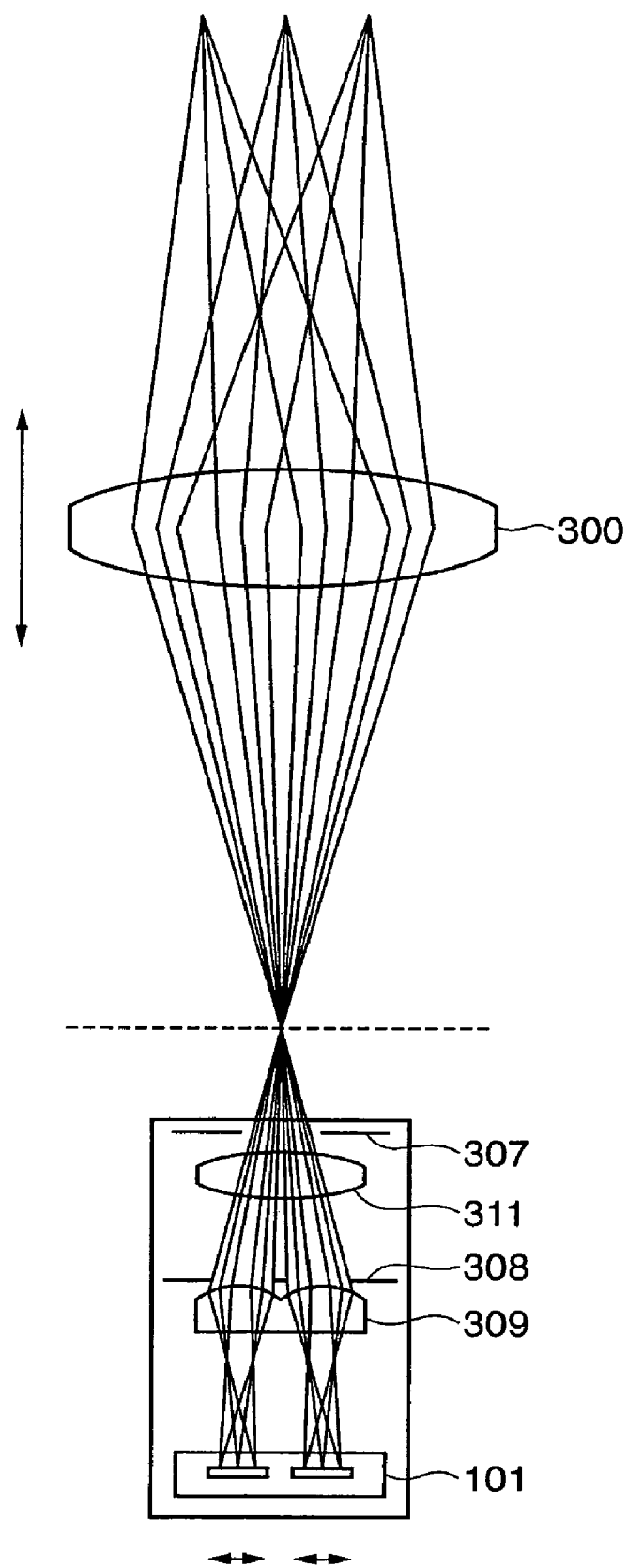
FIG. 3 is a diagram showing the optical structure of a phase difference focus detection method-type focus state detection apparatus installed in a camera according to the embodiment of the present invention.

The detailed structure of the optical system for focus state detection is shown in FIG. 3. Light rays from the subject that pass through the image sensing lens 300 are reflected by the sub-mirror 306 (see FIG. 2) and temporarily focused on the vicinity of the field mask 307 in a conjugated plane with an image sensing plane. In FIG. 3, paths of light reflected back by the sub-mirror 306 are developed and shown. The field mask 307 is a member for shutting out extraneous light from points other than the distance measurement points (focus state detection area) in the screen.

The field lens 311 causes the openings of the aperture 308 to focus on the vicinity of the exit pupil of the image sensing lens 300. The secondary focusing lens is located behind the apertures 308 and is composed of a pair of lenses, with each lens corresponding to each opening in the aperture 308. The light rays that pass through the field mask 307, field lens 311, the aperture 308 and the secondary focusing lens 309 are focused on the line sensors (sensor array) of the AF sensor 101. Moreover, the line sensors of the AF sensor 101 are configured so as to be able to focus light rays from different subjects within the image sensing screen as well.

A description will now be given of the relative positions of the line sensors on the AF sensor 101 and the distance measurement points in the image sensing screen, with reference to FIG. 4 and FIG. 5.

Figure 4:
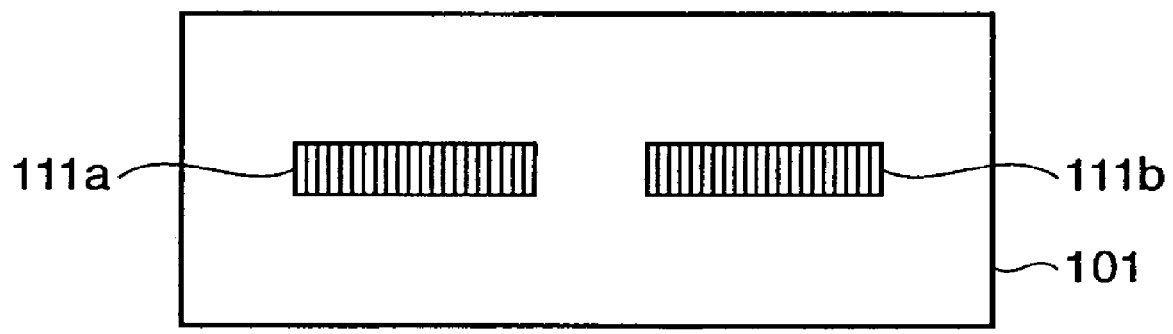
FIG. 4 is a diagram showing sensor arrays (line sensors) of a phase difference focus detection method-type AF sensor according to the embodiment of the present invention.

FIG. 4 is a diagram showing the layout of the line sensors in the AF sensor 101. A pair of line-shaped line sensors 111a and 111b is disposed in the AF sensor 101.

Figure 5:
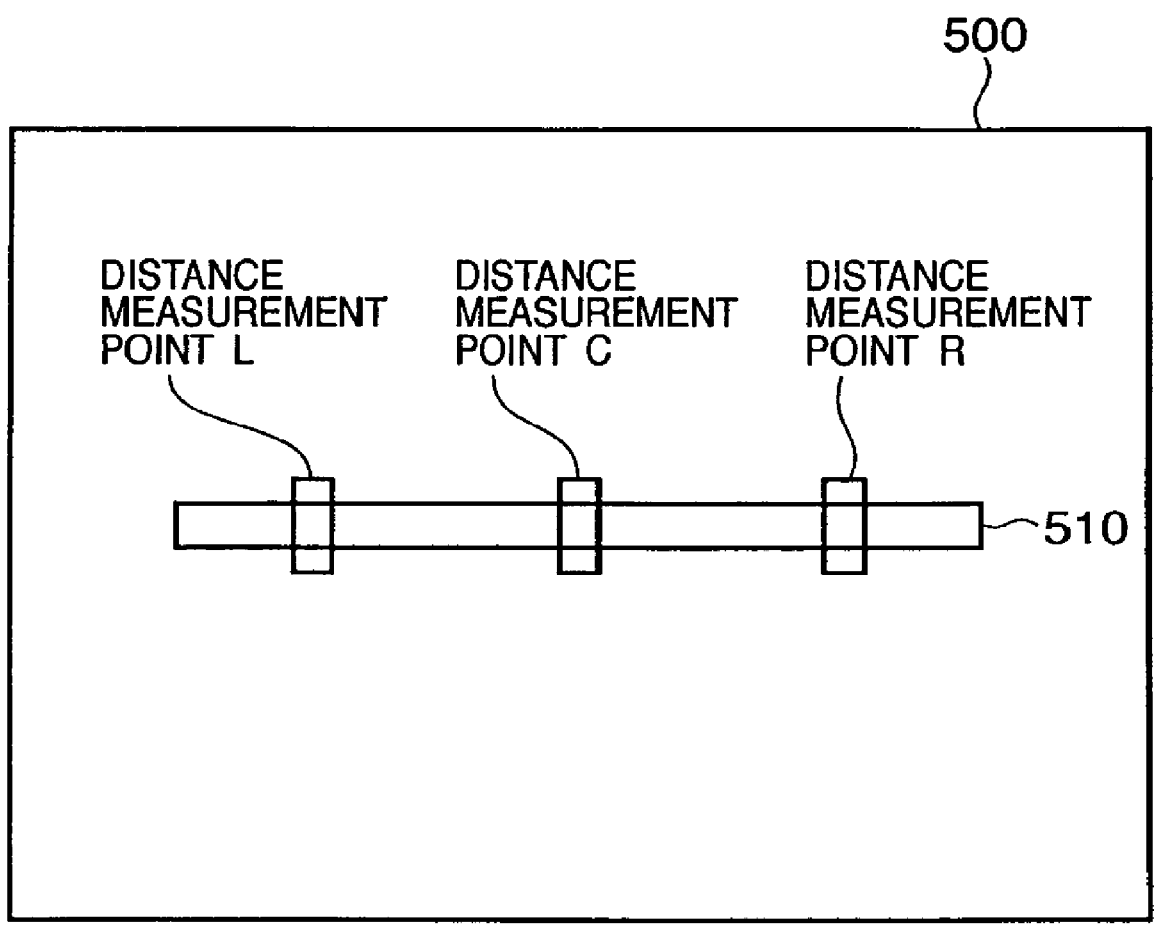
FIG. 5 is a diagram showing the positional relation between distance measurement points and an AF field of view according to the embodiment of the present invention.

FIG. 5 is a diagram showing the layout of the distance measurement points displayed in a viewfinder 500 and the range of an AF field 510 of the line sensors 111a, 111b on the AF sensor 101. Three distance measurement points L, C and R are set on the AF field 510, enabling focus state detection for three different subjects corresponding to each of the distance measurement points.

Figure 6:
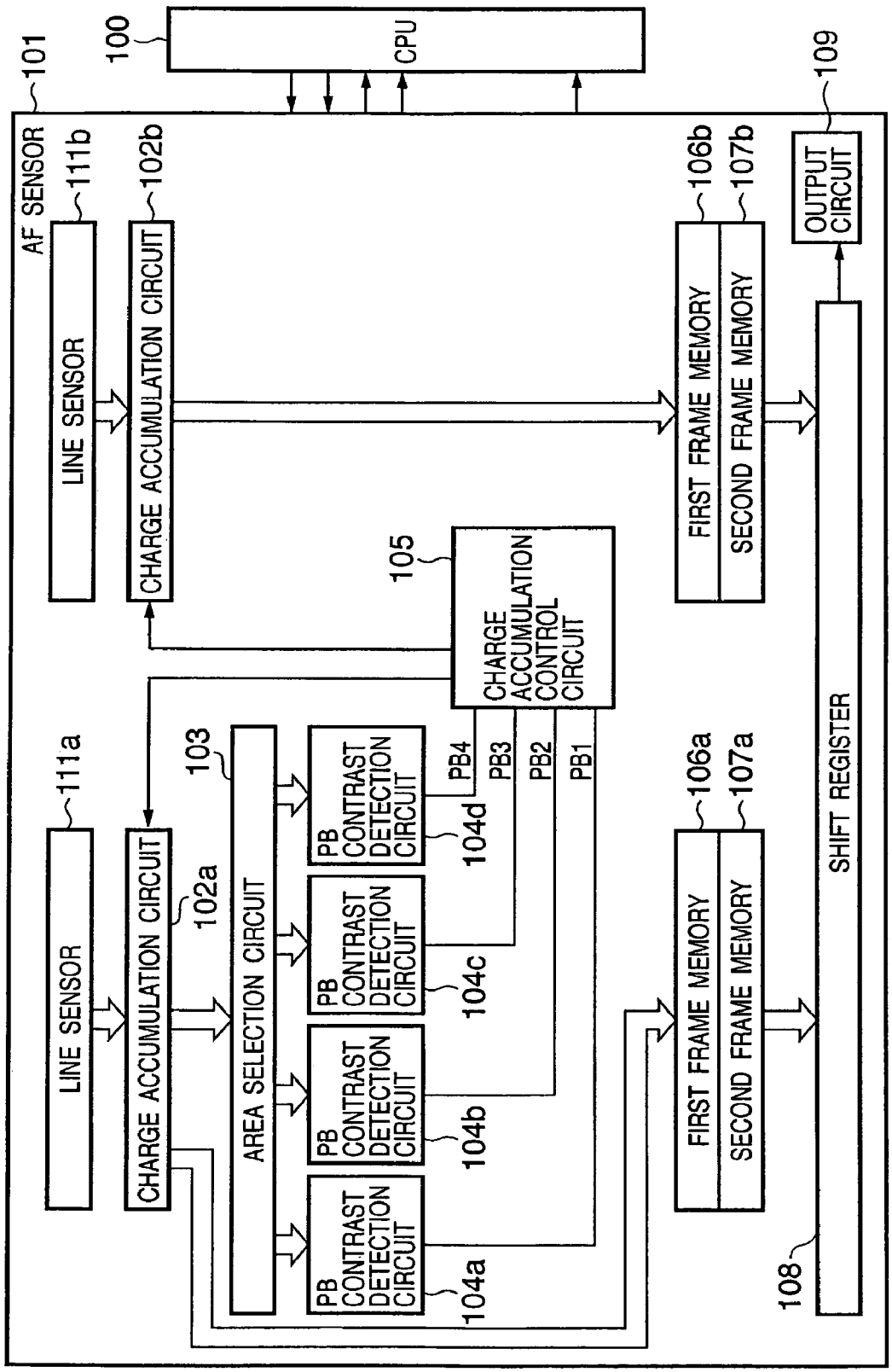
FIG. 6 is a block diagram showing the structure of an AF sensor according to the embodiment of the present invention.

A description will now be given of the detailed circuit structure of the AF sensor 101, using the block diagram shown in FIG. 6.

The subject image focused by the secondary focusing lens 309 described above is photoelectrically converted at the line sensors 111*a*, 111*b*. The line sensors 111*a*, 111*b* are composed of a plurality of pixels aligned in lines, with signals photoelectrically converted into voltages at the pixels accumulated in charge accumulation circuits 102*a*, 102*b*. An area selection circuit 103 divides the signals accumulated in the accumulation circuit 102*a* among three areas and inputs the accumulated signals to PB contrast detection circuits 104*a*, 104*b*, 104*c*. Furthermore, the area selection circuit 103 has the function to input all the signals accumulated in the accumulation circuit 102*a* and to a PB contrast detection circuits 104*d*.

The PB contrast detection circuits 104*a*, 104*b*, 104*c* and 104*d* detect the largest signals (hereinafter "Peak signals") and the smallest signals (hereinafter "Bottom signals") among the accumulated signals of the pixels and outputs differential signals between the Peak signals and the Bottom signals (hereinafter "PB signals") to a charge accumulation control circuit 105. The PB signals that are detected by the PB contrast detection circuits 104*a*, 104*b*, 104*c* and 104*d* are called PB1, PB2, PB3 and PB4, respectively.

The charge accumulation control circuit 105 compares the PB1, PB2, PB3 and PB4 to a target value. Then, when the PB1, PB2, PB3 and PB4 become greater than the target value, the charge accumulation control circuit 105 outputs send signals to the charge accumulation circuits 102*a*, 102*b* in order to send the accumulated signals corresponding to the ranges selected by the area selection circuit 103 to frame memories to be described later. The accumulated signals of the areas that are input to the PB contrast detection circuits 104*a*, 104*b*, 104*c* are sent to first frame memories 106*a*, 106*b*. Furthermore, the accumulated signal of all areas that is input to the PB contrast detection circuit 104*d* is sent to second frame memories 107*a*, 107*b*, thus permitting simultaneous charge accumulation control even if the areas to be subjected to charge accumulation control overlap. It should be noted that the first frame memories 106*a*, 106*b* and the second frame memories 107*a*, 107*b* are not limited to frame memories, provided that they have sufficient capacity to store the accumulated signals output from the charge accumulation circuits 102*a*, 102*b*.

Once the signals of all the areas selected by area selection circuit 103 are transmitted to the frame memories 106*a*, 106*b*, 107*a* and 107*b*, the charge accumulation control circuit 105 causes the charge accumulation circuits 102*a*, 102*b* to finish accumulation and to output an accumulation finished signal to the CPU 100.

The accumulated signals stored in the first frame memories 106*a*, 106*b* and the second frame memories 107*a*, 107*b* are output as accumulated signals at each pixel by the CPU 100 driving a shift register 108 to an output circuit 109. The output circuit 109 amplifies and otherwise processes the accumulated signals and outputs the processed accumulated signals to an AD converter, not shown, of the CPU 100.

Using FIGS. 7 and 8, a description will now be given of an example in which the line sensors 111*a*, 111*b* are divided into three areas.

Figure 7:
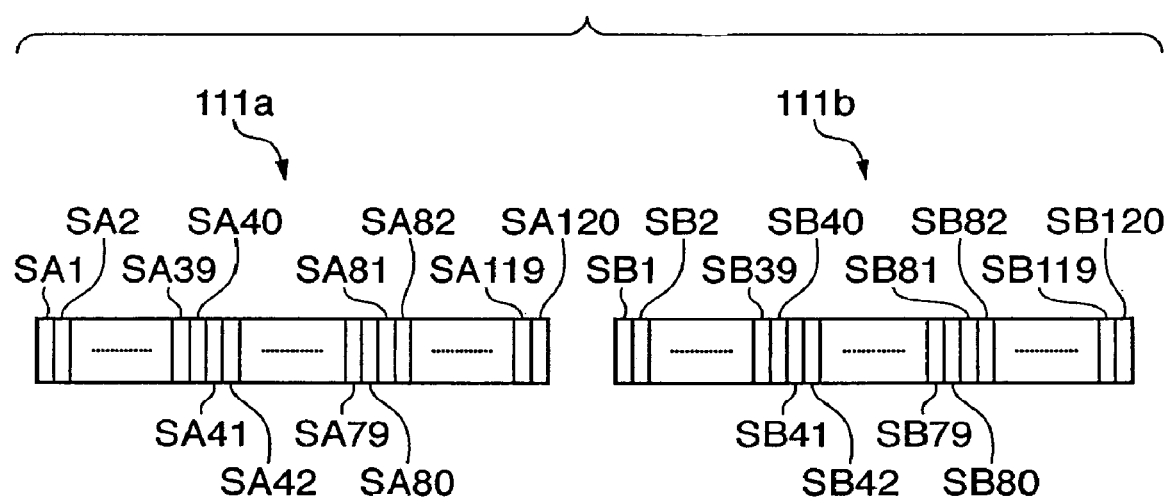
FIG. 7 is a diagram showing an example of the pixel structure of the AF sensor according to the embodiment of the present invention.

In FIG. 7, the line sensors 111*a* and 111*b* are each composed of 120 pixels. An accumulated signal of a first pixel of line sensors 111*a* is designated SA1 and an accumulated signal of an nth pixel is designated SAn. Similarly, an accumulated signal of a first pixel of line sensor 111*b* is designated SB1 and an accumulated signal of an nth pixel is designated SBn.

Here, the area selection circuit 103 selects (assigns) areas such that the accumulated signals of the range of areas SA1-SA40 are input to PB contrast detection circuit 104*a* and the accumulated signals of the range of areas SA41-SA80 are input to PB contrast detection circuit 104*b*. In addition, area selection circuit 103 selects (assigns) areas such that the accumulated signals of the range of areas SA81-SA120 are input to PB contrast detection circuit 104*c* and the accumulated signals of the range of areas SA1-SA120 are input to PB contrast detection circuit 104*d*.

Figure 8:
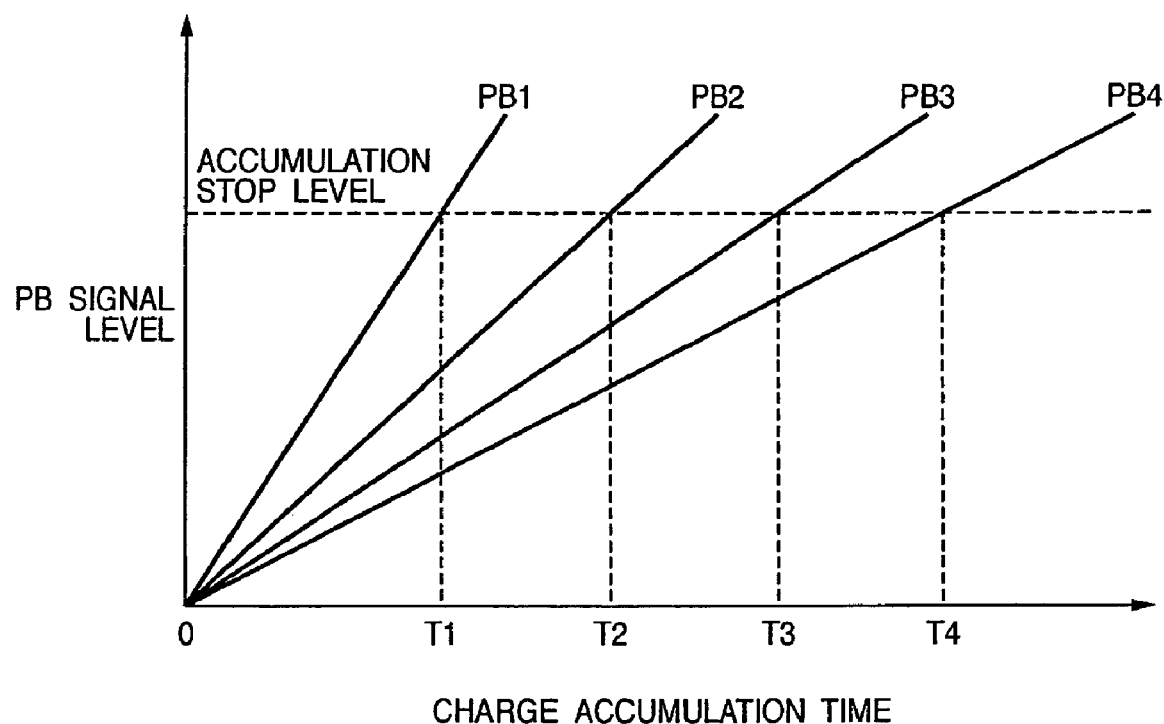
FIG. 8 is a diagram illustrating a PB signal level and charge accumulation time control method according to the embodiment of the present invention.

FIG. 8 is a diagram showing the relation between charge accumulation time and the signal level of the PB signals PB1, PB2, PB3 PB4, which are the output signals of the PB contrast detection circuits 104*a*, 104*b*, 104*c* and 104*d*. A charge accumulation time 0 designates the start of charge accumulation, with the PB signals increasing as time passes. These signals are compared to an accumulation stop level by the charge accumulation control circuit 105. Times at which the PB signals PB1, PB2 and PB3 meet or exceed the stop level are designated T1, T2 and T3, respectively. In such cases, at a time T1 the accumulated signals corresponding to areas SA1-SA40 and SB1-SB40 input to the PB contrast detection circuit 104*a* are sent to the first frame memories 106*a*, 106*b*. At a time T2, the accumulated signals corresponding to areas SA41-SA80 and SB41-SB80 input to the PB contrast detection circuit 104*b* are sent to the first frame memories 106*a*, 106*b*. At a time T3, the accumulated signals corresponding to areas SA81-SA120 and SB81-SB120 input to the PB contrast detection circuit 104*c* are sent to the first frame memories 106*a*, 106*b*.

In addition, a time at which PB signal PB4 of the PB contrast detection circuit 104*d* meets or exceeds the accumulation stop level is designated T4. At time T4, an accumulated signal corresponding to all areas SA1-SA120 and SB1-SB120 input to the PB contrast detection circuit 104*d* is sent to the second frame memories 107*a*, 107*b*.

The charge accumulation circuits 102*a*, 102*b* are configured so as to be able to send accumulated signals to the frame memories non-destructively. For example, even after accumulated signal SA1-SA40 and SB1-SB40 are sent to the first frame memories 106*a*-106*b* the charge accumulation operation is continued without destruction of those accumulated signals. Therefore, at time T4, the accumulated signals corresponding to all areas SA1-SA120 and SB1-SB120, including also the accumulated signals of areas SA1-SA40 and SB1-SB40, can be sent to the second frame memories 107*a*, 107*b*. Accordingly, a re-accumulation of the signals for the purpose of sending them to the second frame memories 107*a*, 107*b* is rendered unnecessary.

Thus, as described above, the PB signals that express subject image contrast are detected at each selected area and the signals are accumulated until they meet or exceed a predetermined level, enabling optimum charge accumulation control to be carried out at each area.

A detailed description will now be given of the operation of the focus state detection apparatus configured as described above, based on the flow chart shown in FIG. 9.

Once a focus state detection start signal is received through operation of the group of switches 214, the AF sensor 101 starts focus state detection. First, in step S701, the CPU 100 determines whether or not the group of switches 214 is set to a large defocus mode or not. If the group 214 is set to the large defocus mode, processing then proceeds to step S702 and a second charge accumulation control area capable of detecting a large amount of defocus, is set. By contrast, if the group 214 is not set to the large defocus mode, processing then proceeds to step S703 and a first charge accumulation control area is set.

A description will now be given of the first charge accumulation control area setting and the second charge accumulation control area setting, using FIGS. 10A and 10B.

FIG. 10A is a diagram illustrating a first charge accumulation control area set when the amount of defocus is small. As shown in FIG. 10A, the line sensors are divided into three parts, L area, C area and R area. The amount of defocus is small, and therefore the subject images do not project beyond their respective areas and charge accumulation control is performed at each area. As a result, it is possible to detect the focus states of three different subjects. The area selection circuit 103 within the AF sensor 101 is set to input the accumulated signals of the pixels of the L area to the PB contrast detection circuit 104a, as well as to input the accumulated signals of the pixels of the C area to the PB contrast detection circuit 104b and the accumulated signals of the pixels of the R area to the PB contrast detection circuit 104c, respectively. Moreover, although the line sensors are divided into three areas when setting the first charge accumulation control area as described above, the inputting of the accumulated signals of the W area to the PB contrast detection circuit 104d is not carried out since in this case there is no need to detect a large amount of defocus. Therefore, power to a W area of the PB contrast detection circuit 104d as well as to the second frame memories 107a, 107b for storing the accumulated signals of the pixels of the W area is turned off to prevent unnecessary power consumption.

FIG. 10B is a diagram illustrating the second charge accumulation control area set when the amount of defocus is large. Examination of the bright C area in which a main subject is located indicates that the subject image at this time projects beyond the C area. Accordingly, in such an instance, the L area, C area and R area are combined into a single W area, which enables the line sensors as a whole to obtain a single continuous subject image signal, and enables detection of a focus state in which the amount of defocus is large and the subject image phase difference is large. The area selection circuit 103 is set so as to input the accumulated signals of the pixels of the W area to the PB contrast detection circuit 104d.

Figure 9:
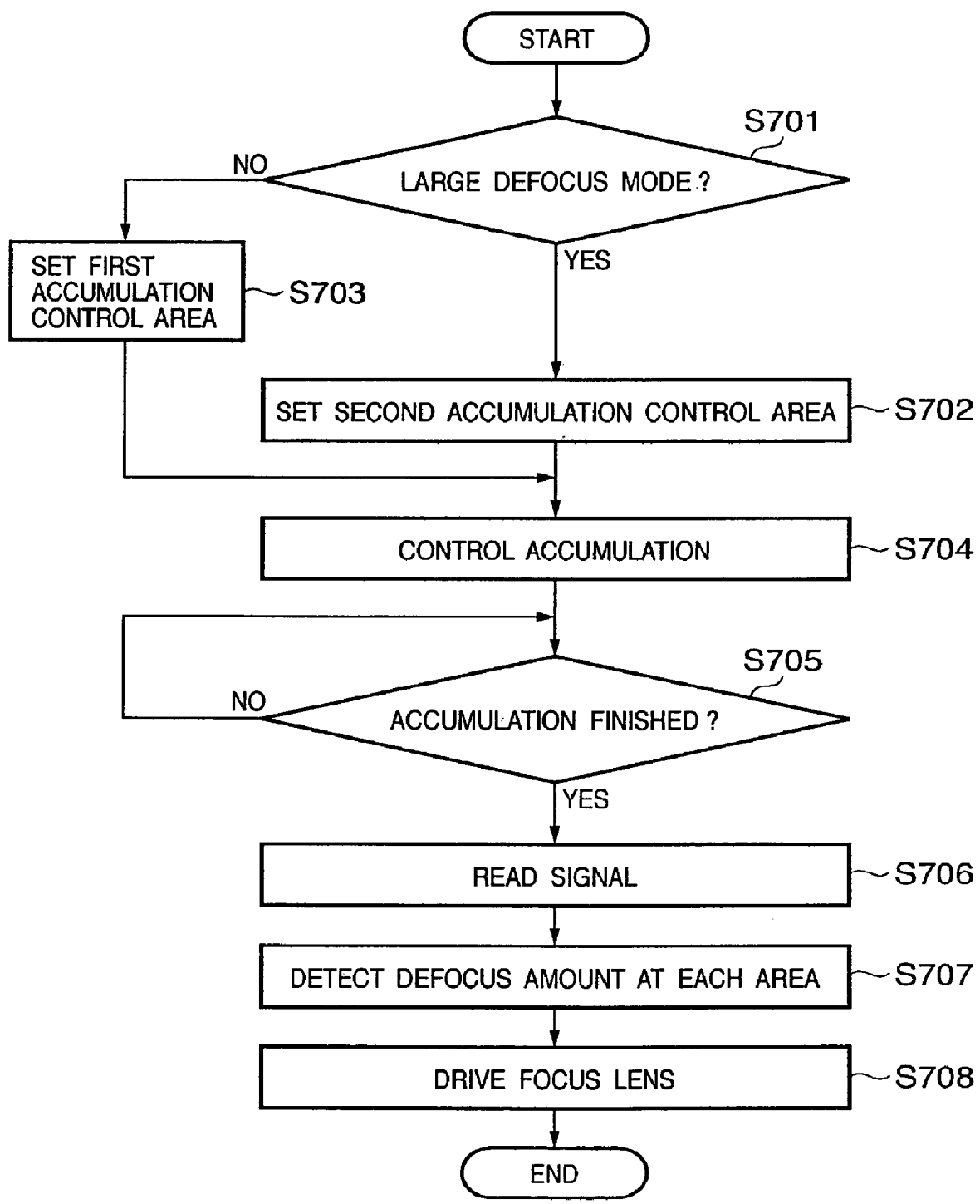
FIG. 9 is a flow chart illustrating the operation of the focus state detection apparatus according to the embodiment of the present invention.

Returning to the flow chart shown in FIG. 9, in step S704 the CPU 100 controls the AF sensor 101 and carries out charge accumulation control for the charge accumulation control areas set in either step S702 or step S703 described above. Then, in step S705, the CPU 100 carries out detection of a charge accumulation finished signal output from the AF sensor 101. The detection operation of step S705 is repeated until the accumulation finished signal is detected. Once the accumulation finished signal is detected, processing proceeds to a signal read operation of step S706.

When processing proceeds to step S706, the operation of reading the pixel signals of the areas is carried out. The CPU 100 controls the AF sensor 101 so as to cause the accumulated signals stored in the first frame memories 106a-106b and the second frame memories 107a, 107b to be output in succession, and the accumulated signals are AD converted by an AD converter in the CPU 100, not shown. Here, the AD-converted accumulated signals are stored in the storage circuits 209 in the CPU 100. Next, in step S707, a correlation calculation is carried out on the basis of the accumulated signals of the L area, C area, R area and W area stored in the storage circuits 209 and the amount of defocus in each of these areas is calculated. In other words, focus state detection results corresponding to each of an L distance measurement point of the L area, a C distance measurement point of the C area and an R distance measurement points of the R area are obtained. Moreover, in the large defocus mode, when the amount of defocus is large, neither L area, C area nor R area can be detected, and therefore results corresponding to a C distance measurement point are obtained from the W area.

Next, in step S708, the CPU controls the driving of the focus lens of the image sensing lens 300 through the lens communications circuit 205 based on the amount of defocus calculated in step S707 and terminates the focus state detection operation sequence.

Thus, as described above, by providing the first frame memories 106a, 106b that store accumulated signals when the amount of defocus is small and the second frame memories 107a, 107b that stores accumulated signals when the amount of defocus is large, the present invention simultaneously enables the line sensors 111a, 111b to be divided into a plurality of areas and charge accumulation control to be carried out at each area as well as enables charge accumulation control for a single wide area composed of the plurality of areas combined. Therefore, when a plurality of subjects is present within the image sensing screen, it is possible to carry out focus state detection for each subject. Moreover, although the amount of defocus might increase depending on the state of the image sensing lens and the position of the subject, in that case as well, the time required for focus state detection can be reduced and the release time lag shortened.

In addition, the PB signal that expresses subject image contrast is detected at each selected area and stored until that signal meets or exceeds a predetermined level, enabling optimum charge accumulation control for each area to be carried out.

In addition, in a case in which it is not necessary to carry out detection when the amount of defocus is large, such as when it is apparent that the maximum amount of defocus is small, the present invention enables needless power consumption to be prevented by prohibiting charge accumulation control over a wide area composed of a plurality of areas combined and furthermore by cutting off the supply of power to those circuits related to charge accumulation control for such wide area (specifically, the PB contrast detection circuit 104d and the second frame memories 107a, 107b).

It should be noted that, although the charge accumulation area is divided into three areas in the embodiment described above, the present invention is not limited thereto and charge accumulation control may be divided among four or more areas. In such an instance, the focus state detection apparatus may be configured so that it is possible to select a medium amount of defocus in addition to the large amount of defocus and the small amount of defocus described above, such that, for example, two of the four areas are combined and accumulation control is carried out over at least two or more areas combined.

As many apparently widely different embodiments of the present invention can be made without departing from the spirit and scope thereof, it is to be understood that the invention is not limited to specific embodiments thereof except as defined in the appended claims.

This application claims the benefit of Japanese Patent Application No. 2005-031278 filed on Feb. 8, 2005, which is hereby incorporated by reference herein in its entirety.

What is claimed:

1. A focus state detection apparatus comprising:
    a sensor that senses light rays that pass through a lens subjected to focus detection and is composed of a plurality of photoelectric converter elements;
    an accumulation controller that selectively controls accumulation of pixel signals obtained by said sensor at each area of a plurality of areas into which said sensor is divided or at each combined area obtained by combining at least a portion of the plurality of areas;

a first storage unit that stores each accumulated signal of each of the plurality of areas accumulation-controlled by said accumulation controller;

a second storage unit that stores each accumulated signal of each of the combined areas accumulation-controlled by said accumulation controller; and a defocus state detector that detects a defocus state from the accumulated signals stored in said first storage unit and said second storage unit.

2. The focus state detecting apparatus according to claim 1, wherein a charge accumulation unit continues a charge accumulation operation without erasing the accumulated signal even after forwarding the accumulated signal to said first storage unit.

3. The focus state detection apparatus according to claim 1, wherein:

said accumulation controller individually compares a difference between a maximum signal and a minimum signal of the accumulated signals obtained at each of the plurality of areas to a pre-set signal level, and individually stops the accumulation operation at each area in which the difference reaches the pre-set signal level, and compares a difference between a maximum signal and a minimum signal of the accumulated signals obtained at the combined areas to a pre-set signal level, and stops the accumulation operation when the difference reaches the pre-set signal level.

4. The focus state detection apparatus according to claim 1, wherein:

said sensor is a pair of sensors each of which senses a different pair of light rays from among the light rays that pass through the lens; and said defocus state detector detects a defocus state based on a phase difference obtained from the accumulated signals of a pair of images subjected to focus state detection focused on said sensor.

5. The focus state detection apparatus according to claim 1, further comprising a selection unit that selects a large defocus mode, wherein said defocus state detector detecting a defocus state using an accumulated signal stored in said first storage unit when the large focus mode is not selected, said defocus state detector detecting a defocus state using an accumulated signal stored in said second storage unit when the large focus mode is selected.

6. The focus state detection apparatus according to claim 1, wherein power to said accumulation controller and said second storage unit is cut off when defocus state detection is carried out using the accumulated signal stored in said first storage unit.

7. An optical instrument equipped with the focus state detection apparatus according to claim 1.

* * * * *